April 15, 1924. 1,490,595
A. J. DE LATEUR
VENEER AND ROTARY CUT LUMBER UNSTACKING MACHINE
Filed March 26, 1923 4 Sheets-Sheet 2
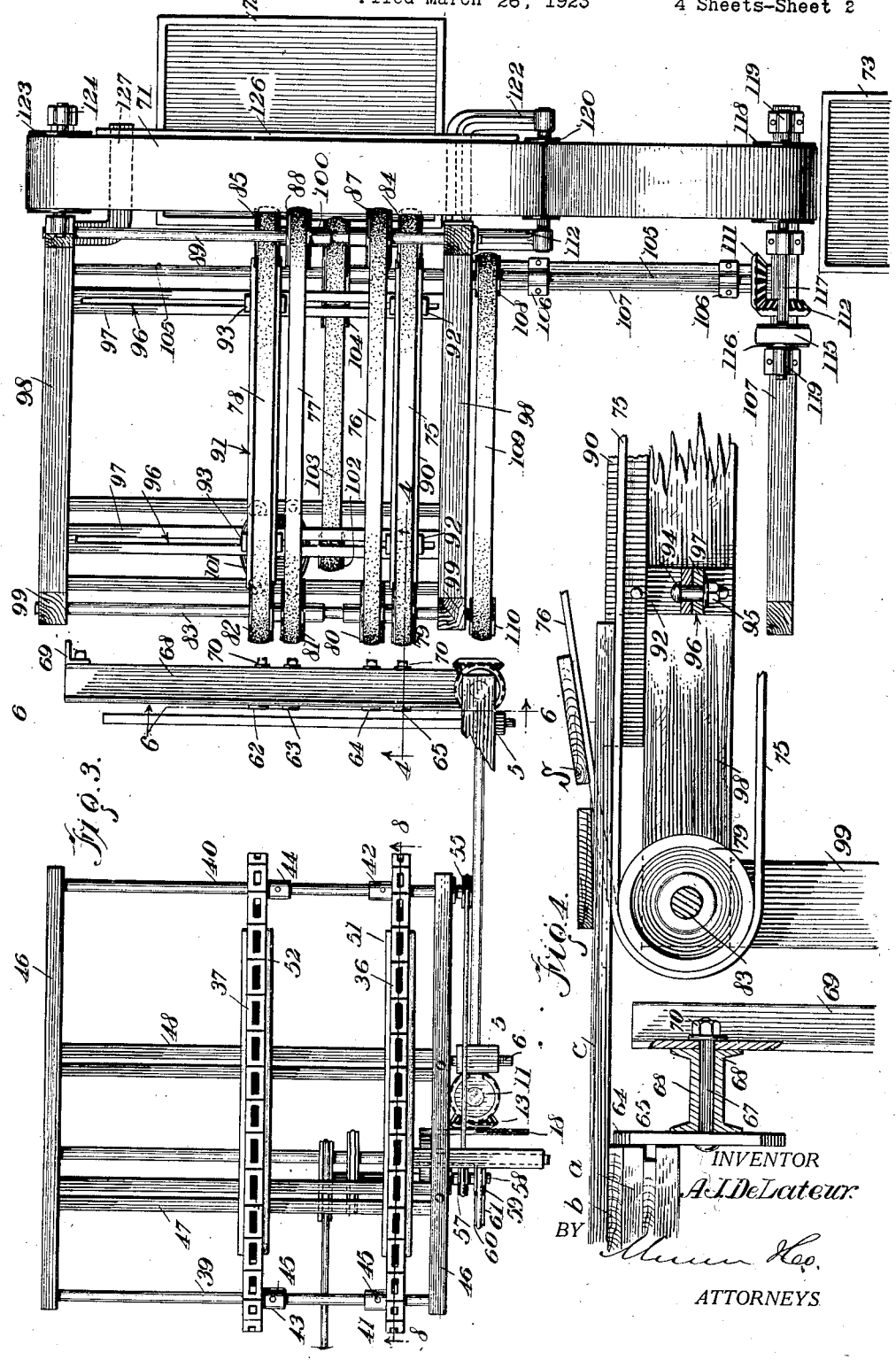
INVENTOR
A. J. DeLateur
BY
ATTORNEYS

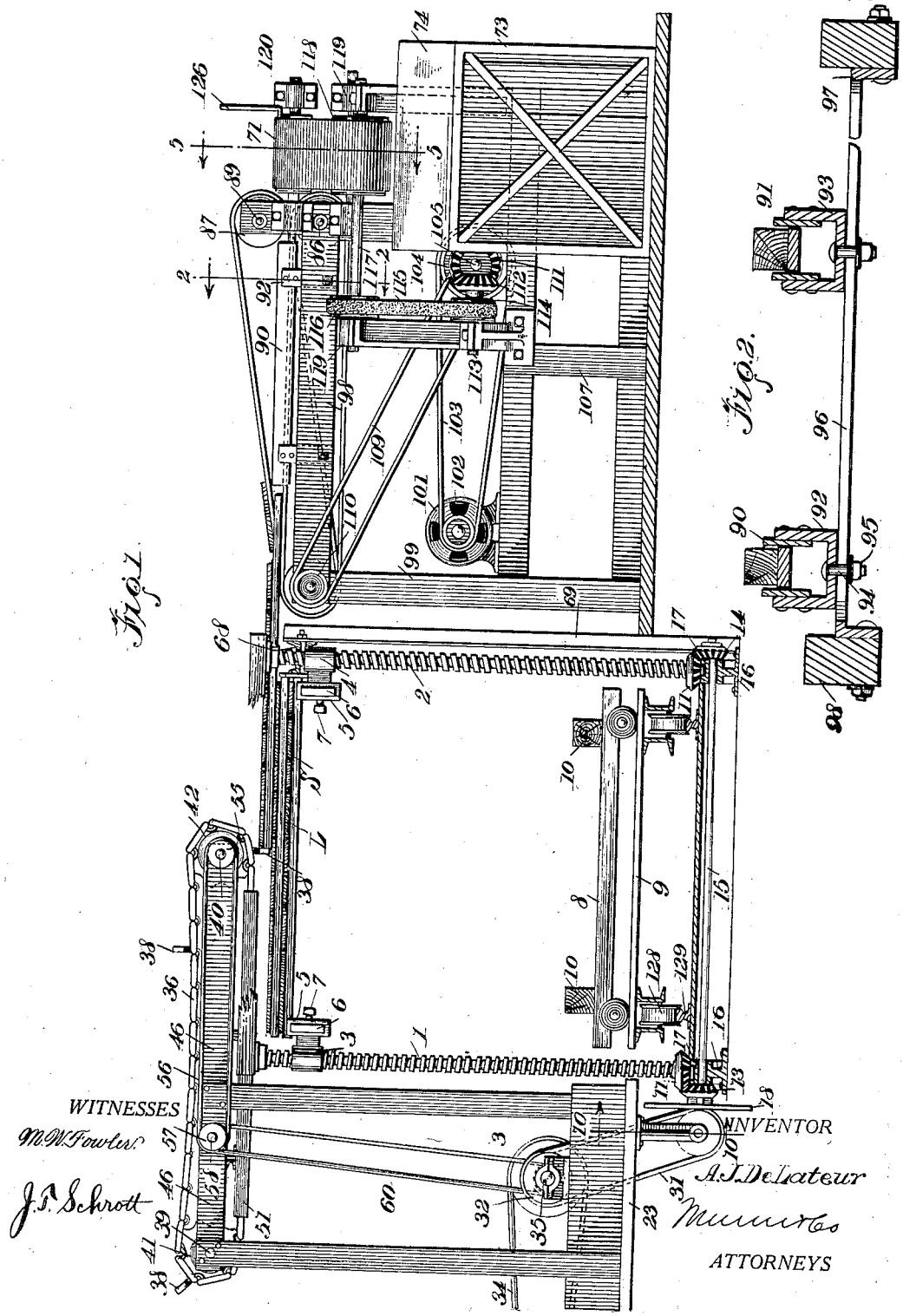

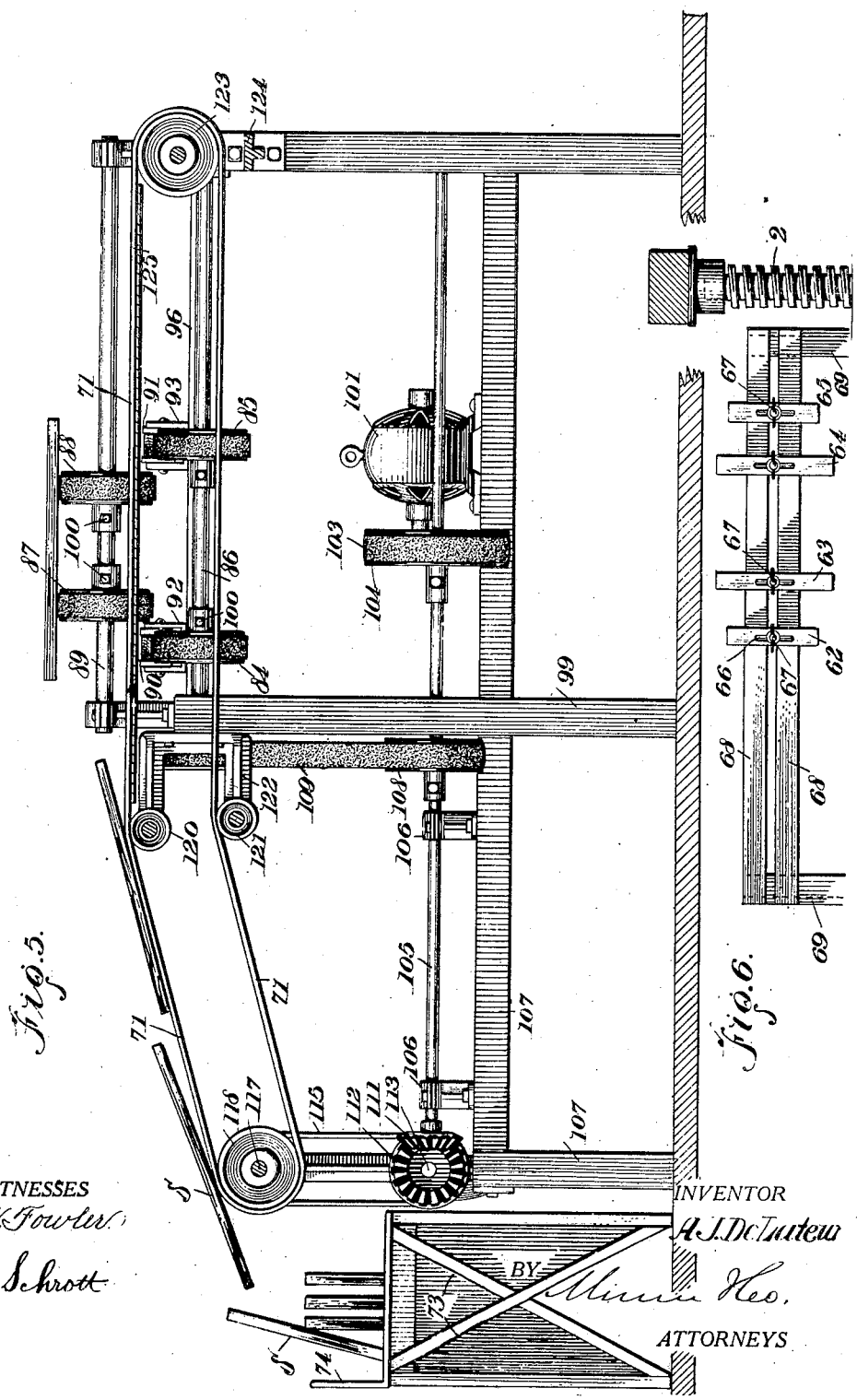

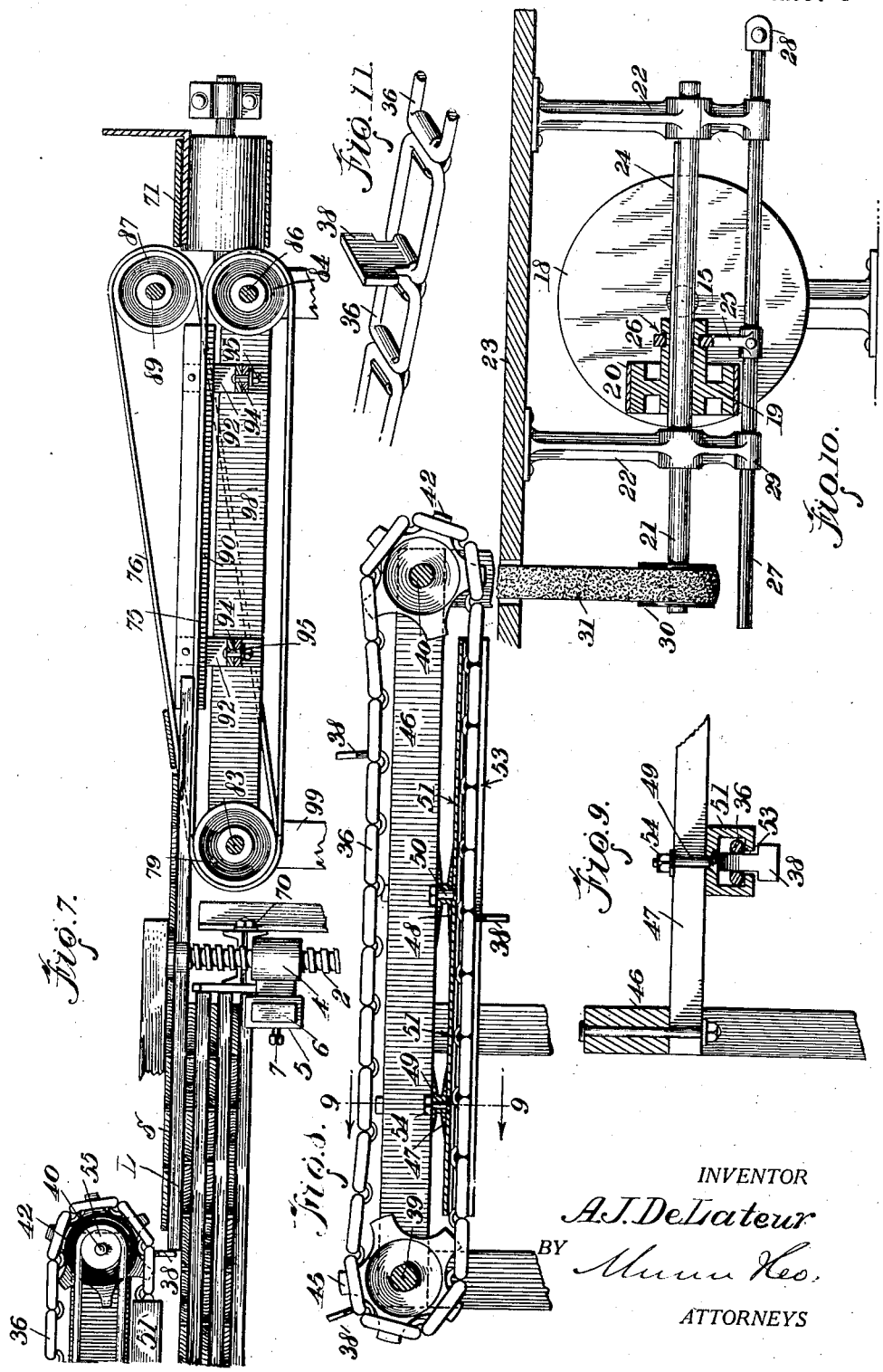

Patented Apr. 15, 1924.

1,490,595

UNITED STATES PATENT OFFICE.

ALPHONSE JOSEPH DE LATEUR, OF RAYMOND, WASHINGTON.

VENEER AND ROTARY CUT LUMBER UNSTACKING MACHINE.

Application filed March 26, 1923. Serial No. 627,827.

*To all whom it may concern:*

Be it known that I, ALPHONSE JOSEPH DE LATEUR, a citizen of the United States, and a resident of Raymond, in the county of Pacific and State of Washington, have invented certain new and useful Improvements in Veneer and Rotary Cut Lumber Unstacking Machines, of which the following is a specification.

My invention relates to improvements in lumber unstackers and it consists of the constructions, combinations and mode of operation herein described and claimed.

An object of the invention is to provide a machine for separating veneer, box shooks and rotary cut lumber of various descriptions from the spacing sticks after it has been removed from the place of drying.

A further object of the invention is to provide a machine for elevating a stack of dried lumber and the sticks which space the layers of lumber apart in respect to seating means which is adapted to advance the uppermost layer and the companion spacing sticks toward other means which separates the two and deposits them in separate hoppers or trucks.

Another object of the invention is to provide means to prevent feeding of more than one layer of dried stock and companion spacing sticks at a time.

Other objects and advantages will appear in the following specification, reference being had to the accompanying drawings, in which:

Fig. 1 is a side elevation illustrating the general arrangement of the improved lumber unstacking machine, Fig. 2 is a cross section on the line 2—2 of Fig. 1 showing the guides at the sides of the stick feeding belt, Fig. 3 is a plan view, Fig. 4 is a detail longitudinal section taken on the line 4—4 of Fig. 3, Fig. 5 is a cross section taken on the line 5—5 of Fig. 1, and showing the conveyor which carries the separated dried lumber to a hopper at one end, Fig. 6 is a view as seen on the line 6—6 of Fig. 3, showing the adjustable stop by means of which the feeding of more than one layer of stock and sticks is prevented, Fig. 7 is a detail side elevation of the upper part of the unstacker in Fig. 1, a portion of the separating table being shown in section, Fig. 8 is a detail longitudinal section on the line 8—8 of Fig. 3 showing one of the feed chains which advances the uppermost layer of stock and sticks toward the separating table, Fig. 9 is a detail cross section on the line 9—9 of Fig. 8, showing how the feeding chain is supported so that it will not slag, Fig. 10 is a section on the line 10—10 of Fig. 1, showing the driving and reversing mechanism, and Fig. 11 is a detail perspective view of a portion of one of the feeding chains showing one of the lugs for engaging and advancing the sticks.

This machine may be regarded as companion to the lumber stacking machine disclosed in my co-pending application No. 1, filed March 26, 1923, Serial No. 627,826. That machine is intended to spread a layer of stock upon spacing sticks preparatory to drying the stock either in a kiln or in the open air. The machine of this application takes the same stock and sticks and separates the two so that the sticks fall into one compartment and the stock into another.

The description is divided into the following subjects; (1) the stacking elevator, (2) the feeding means, (3) the stop means, (4) the separating table and (5) the operation. Brief descriptions of local operations accompany the description of parts of the machine, but a résumé of the entire operation is found under the last heading. Consider first

*(1) The stacking elevator* which comprises screw shafts 1 and 2 which respectively have right and left hand threads. Collars 3 and 4 run on the respective shafts, each including a rectangular socket 5 in which the holder brackets 6 are fastened by means of set screws 7. The holder brackets are adapted to support the spacing sticks S and the stock L.

The function of the lumber stacking machine of the other application mentioned above, is to deposit pairs of sticks S each with a layer of stock L spread thereover, upon the holder brackets 6. As this performance progressed, the elevator gradually lowered the stack upon a kiln truck corresponding with the truck 8 in Fig. 1. That truck was then conveyed to the place of drying. In the present application the truck 8 is brought from the place of drying by the transfer truck 9, and when the former is in the proper position in respect to the stacking elevator, the holder brackets 6 are fitted under the dried stack which is then caused to raise by the operation of the elevator.

It is to be observed that the kiln truck 8 has bolsters 10. These stand high enough above the floor of the truck to make ample room for the insertion of the holder brackets 6. These are adjustable in the sockets 5 as the set screws 7 indicate. Having gotten the brackets in position beneath the stack, the elevator is started so that the collars 3 and 4 move upward slowly.

The respective screw shafts have bevel gears 11 and 12. These are driven by corresponding gears 13 and 14 on an elevator shaft 15. This shaft is journalled in bearings 16 which are so formed as to provide step bearings at 17 for the screw shafts also. There is a disk 18 (Figs. 1 and 10) at one end of the elevator shaft 15. This disk is driven by a drive wheel 19 which has a paper surface to engage the face of the disk.

A counter shaft 21 carries the drive wheel 20. This shaft is journalled in bearing hangers 22 which are suspended from a floor 23, or any other convenient fixed place. The floor 23 must be suitably supported inasmuch as it carries the separating table and associated mechanism at the right of Fig. 1. The counter shaft 21 has a spline 24 (Fig. 10) which causes the drive wheel 19 to rotate with the shaft, still permit sliding thereof by means of the fork 25.

This fork occupies a groove 26 in an extension of the hub of the drive wheel. The fork is carried by a shifting rod 27 which has a head 28 at one end to which any suitable actuating means may conveniently be connected. The shifting rod is mounted in extensions 29 of the hanger bearings 22. The countershaft 21 carries a pulley 30 which is driven by a belt 31 from a corresponding pulley 32 on a drive shaft 33.

Any suitable means, for example a motor (not shown) may be used to drive the shaft 33 through the medium of a belt 34 (Fig. 1) and a pulley 35. Consider the position of the drive wheel 20 (Fig. 10) as being that of the initial operation of the stacking elevator. The driving directions of the various arrows indicated (Figs. 1 and 10) show that the screw shafts 1 and 2 are moving the collars 3 and 4 upward. This upward motion should be full enough to prevent feeding the uppermost layer and sticks too rapidly to the feeding means.

Variations of speed are obtained by shifting the drive wheel 19 between the periphery and the center of the disk 18 at the left side of the shaft 15 in Fig. 10. Shifting the drive wheel 19 directly on the center will cause the elevator shaft 15 to stop. Shifting it past the center to the right of the disk will cause a reversal of the shaft 15. Such reversal is necessary in order to bring the collars 3 and 4 down again to the original position beside the bolsters 10 when it is desired to pick up another stack.

(2) The feeding means consists of a plurality of chains 36 and 37 (Fig. 3) which have lugs 38 for the purpose of engaging the uppermost sticks and the carried layer of stock and advancing all together toward the separating table (Fig. 1). Shafts 39 and 40 (Fig. 3) respectively carry pairs of sprockets 41, 42 and 43, 44 to which the respective chains 36 and 37 are applied. These sprockets have means 45 by which they may be adjusted along the shafts 39 and 40 to accommodate various spacings of sticks S. The reader will readily understand that wide stock will be supported by sticks that are spaced farther apart than sticks supporting shorter stock. Such variations must be compensated for by the adjusting positions which the means 45 afford.

A suitable frame 46 supports both the shafts 39 and 40 and other parts of the feeding means. For example, the frame supports pairs of channel irons 47 and 48 which are placed in opposition as shown in Fig. 8 to form slots (in effect) in which bolts 49 and 50 are situated. These bolts carry channel guides 51 and 52 in which the lower strands of the chains 36 and 37 run. The channel guides are for the purpose of supporting the lower strands of the feeding chains so that they will not sag. A detail of one of the channels is shown in Fig. 9. It is of rectangular shape, and has a longitudinal slot 53 in the bottom for the purpose of affording passage for the necks of the lugs 38. Adjustments of the channel guides are necessary when the chains and sprockets themselves are adjusted, and for the former purpose the bolts 49 and 50 are fitted with nuts 54 by means of which the adjustments are fixed.

Mounted on one end of the shaft 40 is a pulley 55 which is driven by a belt 56 from a pulley 57 on a countershaft 58. This shaft also carries a pulley 59 which in turn is driven by a belt 60 from a pulley 61 on the drive shaft 33 (Fig. 1). In the operation of the feeding means, the lugs 38 are intended to engage the left ends of the uppermost spacing sticks, together with the dried stock carried thereby, toward the separating means where the stock is separated from the sticks. In order that the feeding means functions properly, the stacking elevator should raise at a sufficient low speed that the layer of stock next following will not bind against the moving and then operating lug 38 before that lug moves up out of range.

(3) The stop means is for the purpose of preventing the feeding more than one layer of stock and more than one layer of spacing sticks which support the layer. It consists of rectangular plates 62, 63, 64, and 65 (Figs. 3 and 6) which are capable not only of lateral adjustment, but may, if desired, have provision for vertical adjustment. The latter may consist of slots 66 which run lengthwise of the plates and are of course disposed perpendicularly to the machine.

The stop plates are held in place by bolts 67 which pass through the aforesaid slots 66 and also through a slot formed by the opposing channel irons 68. These are suitably mounted on angle iron supports 69. By unloosening the nuts 70 of the bolts 67 (Figs. 4 and 7) the stop plates may be slid to any particular adjustment desired.

It is to be observed that the outermost stop plates 62 and 65 are shorter than the middle plates 63 and 64. The former are adapted to be abutted by the spacing sticks *a* (Fig. 4) of the layer *b* of stock next lowest to the sticks *c* which are being advanced to the separating table. The plates 63 and 64 are adapted to be engaged by said layer of stock *b* (Fig. 4) next lowest. When so abutted, the various stop plates prevent the sticks *a* and stock *b* from moving with the advancing sticks as might be the case if the stop plates were not provided, by virtue of the friction between the contacting wood.

(4) The separating table receives the uppermost layer of dried stock L and the two separating sticks which support it, moving the former toward the conveyor 71 (Figs. 1 and 5) and discharging the latter into a hopper or truck 72 (Fig. 3). The conveyor 71 carries the stock to one side where it is discharged into a hopper 73 (Fig. 5). This hopper may be substituted by a truck so that the stock may be hauled away. In either case, the receptacle at the end of the conveyor 71 should have a guard 74 to prevent the stock from being discharged on the floor.

Belts 75, 76, 77 and 78 cause the separation of the stock from the sticks. The respective belts run on pulleys 79, 80, 81 and 82 on the front shaft 83. The outermost belts 75 and 78 are applied to pulleys 84 and 85 on the rear shaft 86 (Figs. 5 and 7). The inner belts 76 and 77 are applied to pulleys 87 and 88 on a shaft 89 situated above the shaft 86.

It is the belts 76 and 77 which separate the stock from the sticks by carrying the former up the incline as shown in Figs. 1 and 7. The inclination of the belts 76 and 77 is caused by the elevation of the shaft 89 above the rear shaft 86. The belts 75 and 78 carry the sticks straight back, whereupon they are discharged beneath the conveyor 71 into the receptacle 72 as explained above.

In order to prevent the dislodgment of the sticks from the stick belts 75 and 78, pairs of guides 90 and 91 (Figs. 2, 3 and 5) are provided. These guides consist of nothing more than long strips of suitably rigid material which flank the sides of the belts 75 and 78, as shown. They form channels in which the spacing sticks move back.

The guides are respectively supported by yokes 92 and 93 (Fig. 2) which have bolts 94 with nuts 95 on the ends. The bolts pass through the slots 96 of bridge pieces 97 which are fastened between the side rails 98 of the separating table frame 99. The provision of adjustment for the guides is made necessary by the adjustability of the various separating pulleys. It is to be observed that in all instances these pulleys have means such as 100 which permit sliding the pulleys to the desired positions upon the shafts upon being unloosened.

A motor 101 (Figs. 1 and 5) furnishes the motive power for the separating table. This motor has no part in driving the stacking elevator and its associated feeding means. It carries a pulley 102 to which a belt 103 is applied. This belt drives a pulley 104 on a countershaft 105. This shaft is journalled in bearings 106 on an extension 107 (Figs. 3 and 5) of the separating frame. A pulley 108 on the countershaft drives a belt 109 the other end of which is applied to a pulley 110 on the front shaft 83. It is through this pulley that the various separating belts 75, etc., are driven.

A bevel gear 111 on the outermost end of the countershaft 105 meshes with a corresponding bevel gear 112 and thereby drives a shaft 113 by which said gear is carried. This shaft has a pulley 114 (Fig. 1) which drives a belt 115 and in turn drives the pulley 116 of the conveyor shaft 117. One end of the conveyor belt 71 is applied to a roll 118 on this shaft. The shaft is journalled in bearings 119.

Idlers 120 and 121 (Fig. 5) support the conveyor belt and are arranged in such a manner as to cause the belts to assume an inclination toward the box 73. The idlers are supported by a bearing bracket 122 which in turn is fastened to the nearest post of the frame 99. The rear roll 123 of the conveyor is supported by a somewhat similar bearing bracket 124. The upper strand of the conveyor belt moves across a platform 125 which is for the purpose of preventing that part of the belt upon which the stack is discharged from sagging. A guard 126 prevents throwing the stock over the conveyor and onto the floor. In practice, the necessary supports for the platform 125 may extend to the nearest post of the frame 99. The bearing bracket 122 may be arranged as a support for one end of this platform, and a somewhat similar bracket 27 (Fig. 3) may support the other end of the platform.

(5) The operation.

Assume that the transfer truck 9 (Fig. 1) is wheeled from a place at which the kiln truck 8 is moved into position thereon. The transfer truck has flanged wheels 128 which run on rails 129 for this purpose. The collars 3 and 4 should be moved down on the screw shafts 1 and 2 so that the holder brackets 6 may be inserted beneath the stack carried by the bolsters 10. The collars are brought down by reversing the driving mechanism.

The reversal of the driving mechanism is accomplished by moving the drive wheel 19 (Fig. 10) to the right side of the shaft 15 on the surface of the disk 18, and when the collars 3 and 4 are in the proper positions in respect to the kiln truck 8, the drive wheel 19 is moved to the center of the shaft, whereupon all driving motion of the elevator shaft 15, ceases. Having gotten the holder brackets 6 in position beneath the stack, the drive wheel 19 is moved to the left of the center (Fig. 10) whereupon the screw shafts 1 and 2 start to rotate in the directions of the arrows in Fig. 1.

The feeding means, consisting of the chains 36 and 37 and the lugs 38, advances the uppermost layer of stock L and the two spacing sticks which support it, toward the separating table. The lugs 38 are of such a nature that they engage the ends of the uppermost spacing sticks (Figs. 1 and 7), and in engaging the ends of the sticks they must necessarily push the layer of stock along also. The stack of stock is gradually moved upward by the elevator as the upper layers are advanced.

The spacing sticks move directly in a straight line toward the belts 75 and 78 (Figs. 1, 3, 4 and 7) and as these belts are horizontal, it follows that the spacing sticks are moved toward the rear of the separating table in a straight line, where they are discharged beneath the conveyor 71 and the supporting platform 125 into a receptacle 72. This may consist of a hopper or a wheeled truck.

However, the stock is carried upward by the belts 76 and 77 which are arranged on an incline by reason of the fact that the shaft 89 is disposed above the shaft 86 which carries the pulleys of the stick separating belts. The stock is carried upward, as stated, and is discharged upon the conveyor 71 which carries the material toward a receptacle 73 (Figs. 1, 3 and 5) whence it may be removed when desired.

As a means of preventing the spacing sticks from riding off of the belts 75 and 78, guides 90 and 91 are disposed at the sides, (Figs. 2 and 3). These guides merely form channels in which the sticks move. Both the yokes 92 and 93 which support the guides 90 and 91 and the various belt pulleys (Fig. 3) are adjustable. The reader will readily see the need for adjustment in events when the spacing of the sticks and the width of stock varies from that shown in these drawings. To this end, the sprockets of the feeding means are also adjustable along the shafts 39 and 40.

There is danger of feeding more than one layer of stock and the accompanying spacing sticks from the feeding means to the separating table. This danger arises out of the friction between the pieces of lumber. However, in order to prevent feeding more than one layer of stock and spacing sticks, provision is made of the stops 62, 63, 64 and 65 in Figs. 3 and 6, which project up high enough to intercept the stock and sticks next lowest (see Fig. 4). These stop plates (for such they are) may also be adjusted both vertically and laterally for obvious reasons.

While the construction and arrangement of the improved lumber unstacking machine as herein described and claimed, is that of a generally prefered form, obviously modifications and changes may be made without departing from the spirit of the invention or the scope of the claims.

I claim:—

1. An unstacker comprising means for moving a stack of stock, and means occupying a position across the path of movement of said stack and operating in a direction different from that of said movement to displace the foremost pieces of stock as the stack advances toward said displacing means.

2. An unstacker comprising an elevator for raising a stack of lumber and the spacing sticks thereof, feeding means operating across the path of movement of the stack adapted to displace the foremost layer and the accompanying spacing sticks, and separating means for receiving said layer and sticks including means for conducting the layer to one point of disposal and the sticks to another.

3. An unstacker comprising an elevator for raising a stack of stock and separating sticks, feeding means for removing the foremost layer of stock and the separating sticks as the stack advances, means for receiving said layer of stock and sticks including means for moving the stock in one direction, and means for moving the sticks in another direction, thereby separating the two.

4. An unstacker comprising an elevator for raising a stack of stock and separating sticks, feeding means for removing the foremost layer of stock and the separating sticks as the stack advances, means for receiving said layer of stock and sticks including means for moving the stock in one direction, means for moving the sticks in another direction, thereby separating the two, a receptacle for receiving the sticks, and means to receive the stock and carry it to a point of disposal.

5. An unstacker comprising an elevator for raising a stack of stock and separating sticks, feeding means against which the stack is raised adapted to displace the uppermost layer of stock and the separating sticks, separating means toward which the stock and sticks are advanced comprising belts running in different directions and upon which the sticks and stock are discharged causing a separating of the two, a receptacle into which the sticks are discharged by certain of the belts, a conveyor upon which the stock is discharged by others of the belts, and a receptacle into which the conveyor discharges.

6. An unstacker comprising an elevator for raising a stack of stock and separating sticks, feeding means against which the stack raises adapted to displace the uppermost layer of stock and the separating sticks, separating means toward which said stock and sticks are advanced comprising belts disposed at an inclination to carry the stock in one direction, belts disposed in another position to carry the sticks in another direction and thereby perform a separation of the stock and sticks, a receptacle to receive the sticks, a conveyor in position to receive the stock from the inclined belts, and a receptacle into which said conveyor discharges.

7. An unstacker comprising an elevator for raising a stack of lumber and separating sticks, feeding means against which the stack is raised adapted to displace the foremost layer of lumber and the separating sticks, and means situated in the path of displacement permitting only the foremost layer and the sticks underneath to pass.

8. An unstacker comprising an elevator for raising a stack of lumber and separating sticks, feeding means against which the stack is raised adapted to displace the foremost layer of lumber and the separating sticks, means situated in the path of displacement permitting only the foremost layer and the sticks underneath to pass, and means situated on the other side of said preventing means causing the lumber to move in one direction and the sticks in another to cause a separation of the two.

9. An unstacker comprising an elevator for raising a stack of lumber and separating sticks, feeding means against which the stack is raised adapted to push off the uppermost layer and the separating sticks thereof, stop means at one side of the stack which the layers and spacing sticks immediately above said foremost layer are adapted to abut when moved by the friction of said displaced layer and sticks thereby preventing feeding more than one layer and sticks, means in line with the sticks to carry them in one direction, and means out of line with the sticks to carry the lumber in another direction and thereby cause a separation.

10. An unstacker comprising an elevator having brackets for holding a stack of lumber and spacing sticks, screw shafts carrying means by which the brackets are supported, driving means to rotate the shafts and raise the brackets and stack, feeding means comprising pushers operating across the top of the stack to displace the foremost layer of lumber and the spacing sticks thereof, and means by which said pushers are operated from said driving means.

11. An unstacker comprising an elevator consisting of brackets for holding a stack of lumber and spacing sticks, collars by which the brackets are supported, screw shafts carrying the collars, a driving shaft having means for rotating the screw shafts; a frame toward which the stack is elevated, shafts supported by said frame, feeding means operated by said shaft said means including pushers to displace the uppermost layer of lumber and the spacing sticks thereof, driving means by which the feeding means on said frame is operated, and a common source of power for said feed driving means and the driving shaft of the elevator.

12. An unstacker comprising an elevator consisting of brackets for holding a stack of lumber and spacing sticks, collars by which the brackets are supported, screw shafts carrying the collars, a driving shaft having means for rotating the screw shafts; a frame toward which the stack is elevated, shafts supported by said frame, feeding means operated by said shaft said means including pushers to displace the uppermost layer of lumber and the spacing sticks thereof, driving means by which the feeding means on said frame is operated, a common source of power for said feed driving means and the driving shaft of the elevator, and means for reversing the direction of the elevator driving shaft to lower the elevator without interfering with the function of the feeding means.

13. An unstacker comprising an elevator for raising a stack of lumber and spacing sticks, feeding means situated in the path of movement of the stack and adapted to displace the uppermost layer of lumber and the spacing sticks thereof, separating means comprising belts for receiving the lumber and conveying it in one direction, belts for receiving the sticks and conveying them in another direction, a cross conveyor for receiving the lumber and carrying it to a point of disposal, means for driving all of the mechanisms of the separating means, and means for driving the elevator and feeding means, the two being independent.

14. An unstacker comprising an elevator consisting of brackets for holding a stack of lumber and spacing sticks, collars by which the brackets are supported, screw shafts upon which the collars are mounted, an elevator shaft carrying a driven disk, means by which the screw shafts are rotated from said elevator shaft to raise the stack, a countershaft carrying a drive wheel in contact with said disk, means by which the countershaft is driven, and means for moving the drive wheel on the countershaft and in respect to the face of the disk to vary the speed of the elevator shaft and to reverse the direction of operation.

15. An unstacker comprising an elevator for raising a stack of lumber and spacing sticks, feeding means comprising a frame situated above the elevator, shafts journalled on the frame, pairs of sprockets carried by the shafts, chains applied to the sprockets carrying pusher lugs to displace the uppermost layer of lumber and the spacing sticks thereof as the stack is raised, and means for driving the shafts comprising a countershaft with driving connections with one of the shafts.

16. An unstacker comprising an elevator for raising a stack of lumber and spacing sticks, feeding means toward which the stack is raised including feeding chains having pushers for displacing the uppermost layer of lumber and the spacing sticks thereof, brackets by which the chains are carried, shafts upon which the sprockets are mounted, and means permitting adjustment of the sprockets along the shafts to adapt the feeding means to various sizes of lumber and various spacings of sticks.

17. An unstacker comprising an elevator for raising a stack of lumber and spacing sticks, feeding means operating across the top of the elevator for displacing the foremost layer of lumber and the spacing sticks thereof, stop means situated in the path of the layer of lumber and spacing sticks immediately below to prevent the displacement of more than one layer and the spacing sticks thereof at a time, means by which said stop means are supported, and means by which said stop means may be adjusted upon said support to accommodate various spacings of sticks.

18. An unstacker comprising an elevator for raising a stack of lumber and spacing sticks, means for displacing the uppermost layer of lumber and the spacing sticks thereof, stop plates situated at one side of the elevator in the path of the lumber and spacing sticks next below, means for supporting said stop plates, and means by which said stop plates are fastened onto said support including means by which they may be adjusted along said support to suit various sizes of lumber and various spacings of sticks.

19. An unstacker comprising an elevator for raising a stack of lumber and spacing sticks, feeding means for displacing the foremost layer of lumber and the spacing sticks thereof, stop plates situated in the path of the lumber next lowest to the uppermost layer, shorter stop plates situated in the path of the spacing sticks under said layer, said stop plates preventing all but the foremost layer and spacing sticks to pass over, a support, and means by which said plates are fastened to said support including means permitting adjustments of the plates to suit various sizes of lumber and various spacings of sticks.

20. An unstacker comprising an elevator for raising a stack of stock, feeding means operating across the stack to displace the foremost layer of stock comprising a feed chain having a pusher, and a channel guide for supporting the lower strand of chain to prevent it from sagging toward the stack having a longitudinal slot for the passage of the pusher.

21. An unstacker comprising an elevator for raising a stack of stock, feeding means operating across the top of the stack for displacing the uppermost layer of stock comprising a chain having a pusher, sprockets by which the chain is carried, shafts upon which the sprockets are adjustable to vary the point of contact of the pusher with the stock, guide means by which the lower strand of the chain is supported to prevent sagging toward the stack, and means upon which the guide means is adjustably mounted to permit corresponding adjustment when the sprockets are shifted.

22. An unstacker comprising an elevator for raising a stack of stock, feeding means operating across the top of the stack for displacing the foremost layer of stock comprising a feeding chain having a pusher, sprockets to which the chain is applied, shafts upon which the sprockets are adjustable to vary the point of contact of the pusher, a frame on which the shafts are journalled, guide means for supporting the lower strand of the chain to prevent sagging toward the stack, and means carried by the frame upon which the guide means is adjustably mounted to permit corresponding shifting when the sprockets are adjusted.

23. In an unstacker, means for separating lumber from the spacing sticks thereof comprising a front shaft, a pair of adjoining pulleys, a pulley mounted on the shaft outside of each of said pulleys, a pair of rear shafts situated one above the other, a pair of adjoining pulleys on the upper rear shaft, pulleys on the lower rear shaft situated outside of said pulleys and in line with the corresponding pulleys on the front shaft, belts applied to corresponding outside pulleys forming separate conveyors for carrying spacing sticks in one direction, and belts applied to corresponding adjoining pulleys constituting a single conveyor for carrying the lumber in a different direction.

24. In an unstacker, means for separating lumber from the spacing sticks thereof comprising a front shaft, a pair of adjoining pulleys, a pulley mounted on the shaft outside of each of said pulleys, a pair of rear shafts situated one above the other, a pair of adjoining pulleys on the upper rear shaft, pulleys on the lower rear shaft situated outside of said pulleys and in line with the corresponding pulleys on the front shaft, belts applied to corresponding outside pulleys forming separate conveyors for carrying spacing sticks in one direction, belts applied to corresponding adjoining pulleys constituting a single conveyor for carrying the lumber in a different direction, and means forming guides at the sides of the stick conveyor belts preventing the sticks from falling off during conveyance.

25. In an unstacker, means for separating the spacing sticks from lumber comprising a conveyor belt for carrying a stick, guides disposed at the sides of the belt to form a channel in which the stick travels, means for supporting the guide means, and means upon which the supporting means is mounted.

ALPHONSE JOSEPH DE LATEUR.